Jan. 15, 1957

K. BEERLI 2,777,739

METHOD OF ASSEMBLING BEARINGS FOR
SPINNING OR TWISTING SPINDLES

Filed July 24, 1953

Karl Beerli
INVENTOR.

BY Meinderoth,
Fud & Ponack
Attys

Jan. 15, 1957  K. BEERLI  2,777,739
METHOD OF ASSEMBLING BEARINGS FOR
SPINNING OR TWISTING SPINDLES
Filed July 24, 1953  2 Sheets-Sheet 2

United States Patent Office 2,777,739
Patented Jan. 15, 1957

2,777,739

METHOD OF ASSEMBLING BEARINGS FOR SPINNING OR TWISTING SPINDLES

Karl Beerli, Niederuster, Switzerland, assignor to Spindel-, Motoren- und Maschinenfabrik A. G., Uster, Switzerland Application July 24, 1953, Serial No. 369,999

Claims priority, application Switzerland July 28, 1952

2 Claims. (Cl. 308—149)

This invention relates to a method of assembling bearings for spinning or twisting spindles, and particularly for connecting the journal casing with the journal bushing receiving the spindle and with a roller bearing destined for guiding the spindle, the spindle bearing being of the type in which the journal casing is provided with a supporting shoulder for the suspension of the journal sleeve by means of a top flange, from which shoulder an enveloping jacket for the roller bearing extends upwardly and preferably terminates in a thickened top edge, while the journal casing between said shoulder and the portion of the journal casing to be secured to the spindle rail has formed thereon a yieldingly resilient connection-zone provided by annular segments separated by transverse slots, which segments constitute bending rods interconnected by webs.

The purpose of said yielding connection-zone is to provide a journal bearing for the working spindle without radial play according to my earlier Patent No. 2,529,904, so that the wharve B runs centrically, while on the other hand the spindle with its journal bushing may carry out pendular movements under the influence of vibrations occurring during operation. Such bearings are particularly suited for high-speed spindles.

The method according to my present invention consists in that said enveloping jacket is brought to a temperature suitable for shrink-connection, that afterwards the journal bushing and the roller bearing are inserted into said jacket and then the top edge of the enveloping jacket is inwardly flanged against counter-face of the roller bearing, whereby a shrink-connection with the journal bushing and the roller bearing is obtained by cooling the inner parts and the enveloping jacket.

The method according to the invention results in a very stable connection of the said portions of the journal to form a unit, which is able to durably withstand without damage the stress to which the spindles are subjected at high speeds.

Further according to the invention the jacket surrounding the roller bearing and the top flange of the bushing are brought to such a temperature that in the course of cooling off a shrink strain or contraction force, effective in axial and radial direction is produced, so that the spindle bushing and the roller bearing are safely held together, and moreover to give the thickened top edge of the enveloping jacket that temperature which allows flanging the edge inwardly in such manner that it does not show any tendency to spring back.

The temperature, which prior to the insertion of the journal bushing and the roller bearing has to be given to the mentioned enveloping jacket, is determined by the material and the wall thickness of the enveloping jacket, in dependence of factors which are in correlation with the desired holding-together-force exerted by the enveloping jacket on the bushing and the roller bearing.

The invention will now be described in detail, reference being had to the accompanying explanation of the method according to the invention, and drawings showing by way of example a complete spindle bearing.

Figure 1:
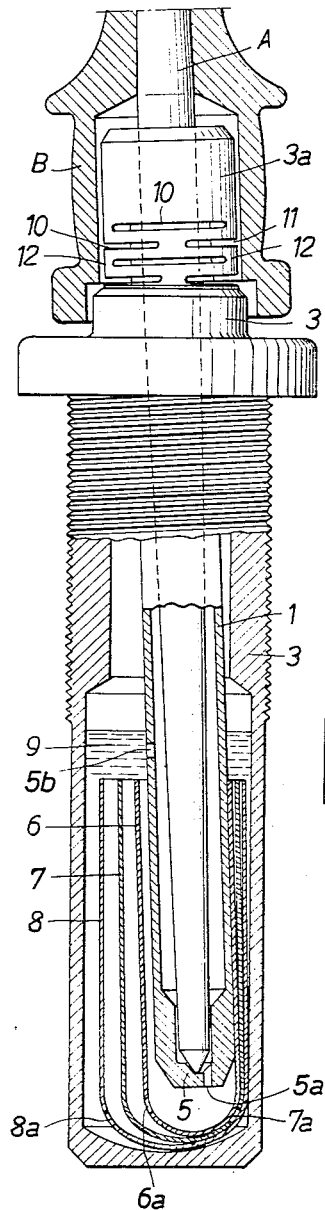
Fig. 1 represents a longitudinal section through a spindle bearing having a spindle inserted therein.
Figure 2:
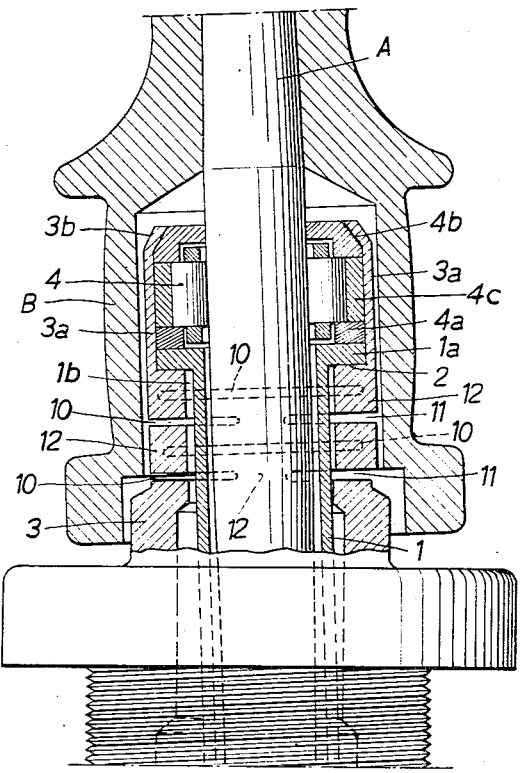
Fig. 2 is drawn to a larger scale and shows in longitudinal section the mentioned yielding connection between the journal casing and the spindle bushing.

Referring to Figs. 1 and 2, the shaft A of a spinning or twisting spindle carries in known manner the wharve B. The spindle shaft A has its lower portion inserted into the journal bushing 1, which is provided with a top flange 1a, by means of which the bushing is suspended on an internal shoulder 2 of the journal casing 3. A circumferential clearance 1b is provided between the cylindrical wall of the sleeve 1 and the journal casing 3. The top flange 1a of the bushing 1 supports the roller bearing 4 by the intermediary of an annular member 4a; this roller bearing serves for guiding the spindle shaft A which has its bottom end supported by a thrust bearing 5 formed in the bushing 1. The journal casing 3 contains a plurality of cylindrical sleeves e. g. 6, 7 and 8, nested one into the other with circumferential play, which sleeves have curved end surfaces, the end surface of the outer sleeve resting on the internal bottom of the journal casing 3. The sleeves 6, 7 and 8 provide in known manner, as shown in my prior U. S. Patent No. 2,583,080, a device receiving the journal bushing 1, which device serves for damping the circular or pendular motions occurring in the upper portion of the working spindle A, when the latter rotates, and which are transmitted to the bushing 1. The journal casing 3 contains lubricating oil 9, which serves as damping fluid and circulates through the sleeves communicating with the oil by their open tops and by apertures 6a, 7a and 8a provided in their bottom surfaces. Openings 5a and 5b are also provided in the bushing 1 so that circulation of the damping fluid 9 also occurs through the bushing during operation.

The outer race 4a of the roller bearing 4 is enclosed by the enclosing jacket or tubular portion 3a formed on the journal casing 3, which enveloping jacket has a comparatively thin cylindrical wall extending upwardly from the shoulder 2 and thus forms the head portion of the casing 3 terminating in an inwardly directed conical top edge 3b. This bent-off top edge 3b of the enveloping jacket 3a has been produced by an inward flanging operation, to apply it against a conical counter-face 4b on the upper annular member on top of the roller bearing 4. The top edge 3b of the enveloping jacket 3a slightly increases in thickness towards the top-face for the purpose of increasing its strength.

Below its head portion, close to the said supporting shoulder 2, the journal casing 3 is provided in each of four transverse planes with two opposite narrow slots 10 and 11, between the ends of which there is left a comparatively wide web 12. In this manner, the slotted portion of the member 3 forms a kind of universal joint, provided in the zone of the wharve B, between the head portion of the journal casing 3 containing the roller bearing 4 and the rigid portion thereof secured to the spindle rail (not shown); in this yielding connection zone of the journal casing 3, receiving the pendular or circular movement of the upper portion of the spindle, the ring segments formed between the webs 12 by the slots 10 and 11 act during operation as bending rods; this bearing construction corresponds to that of Figs. 4 and 5 of my above mentioned Patent 2,529,904. This resiliently yielding connection zone at the journal casing 3 enables a pendular movement of the journal bushing 1 during operation of the spindle, having the center of oscillation in the range of the said connection zone.

Figure 3:
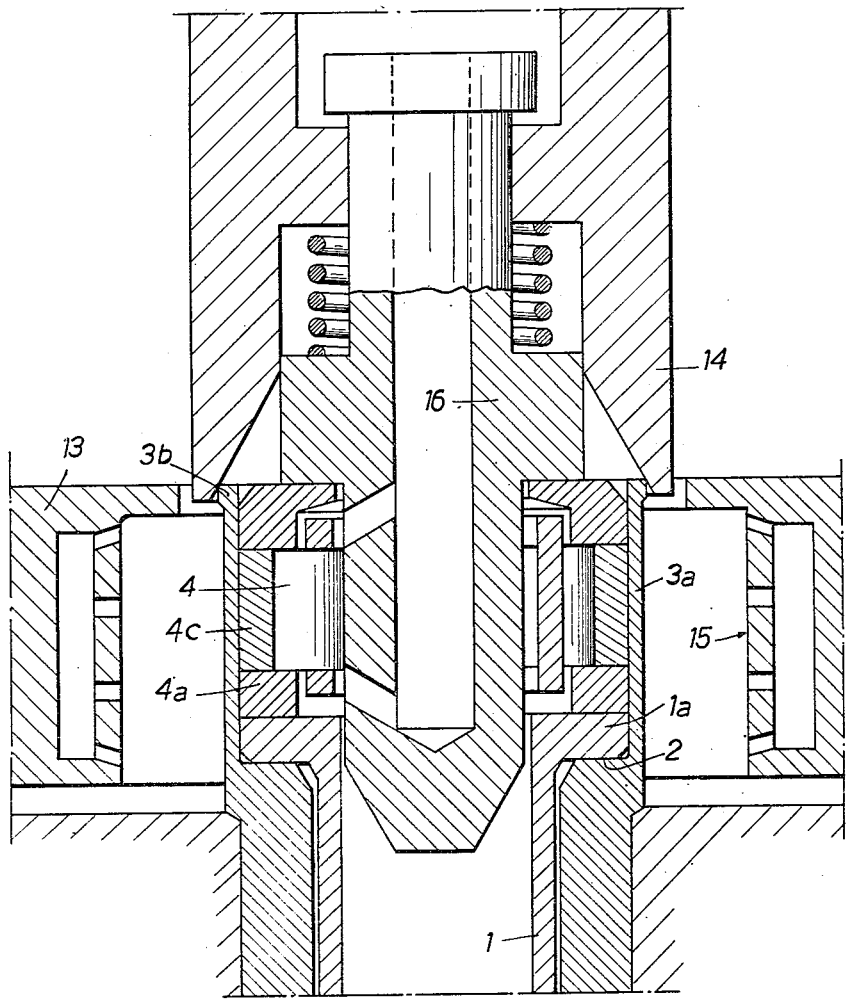
Fig. 3 is a sectional view showing means for heating the head portion of the journal casing and for cooling the internal parts of the casing.

For the purpose of providing the shrink-connection between the enveloping jacket or tubular portion 3a of the journal casing 3 and the bearing bushing 1, as well as the roller bearing 4, the enveloping jacket 3a, before the edge 3b is inwardly flanged (see Fig. 3) is subjected to a heat treatment e. g. by means of a ring burner or of a high frequency heating coil built into a holder 13 in a manner that the enveloping jacket 3a in the zone of its thickened top edge 3b is brought to a higher temperature than the remaining part thereof. During this heat treatment of the enveloping jacket 3a the bushing 1 and the roller bearing 4 are held ready for insertion by means of a mandrel and protected from the action of heat; the bushing and the roller bearing are then introduced into the enveloping jacket 3a at the required speed so that no heat may be transferrred to these parts. As soon as the bushing 1 with its top flange 1a has been brought to rest on the supporting shoulder 2, and the roller bearing 4 is inserted in the jacket 3a, the thickened top edge 3b of the jacket is inwardly flanged by means of a plunger 14 towards the counter-face 4b offered by the roller bearing 4, while at the same time the entire enveloping jacket 3a is cooled so that any heating of parts of the bushing 1 and of the roller bearing 4 in contact with the enveloping jacket 3a is prevented; the selection of the cooling means depends on the given conditions. As shown in Fig. 3, an annular cooling jacket 15 is provided for directing cooling medium to the outer face of the jacket 3a, while a plug nozzle 16 is inserted through the roller bearing 4 to supply cooling medium to the bearing members. While cooling-off, the cylindrical portion of the enveloping jacket 3a and the top edge 3b of same accordingly contract without the top edge 3b having any tendency to spring back. This results in a rigid connection of the enveloping jacket 3a which is stressed, with the parts of the roller bearing 4 and with the top flange 1a of the bushing 1.

The enveloping jacket 3a, when it is heated, is brought to a temperature which, during its subsequent cooling, results in a predetermined contracting strength or permanent tension strength of the enveloping jacket 3a. Of the axial and radial forces arising in the enveloping jacket 3a due to cooling-off of the latter, the first must be greater than the force counter-acting it later i. e. during operation, which force is produced as results of the pendular movement of the spindle, and which results in the deflection of the bending rods provided by the slots 10 and 11. If the force tending to hold together the top flange 1a of the bushing 1, the roller bearing 4 and the jacket 3a would be too small, then the connection would become loose and a certain relative movement would result between the top flange 1a and the supporting shoulder 2 serving as a seat for said flange, which movement would produce friction, fit-rust and thus play; consequently the pendular movement of the enveloping jacket 3a and the top edge 3b would be impaired or made impossible. It is essential during operation that the roller bearing with respect to its axis is forced to follow the pendular motions of the upper portion of the spindle, and this is attained according to my present invention in that the journal bushing 1, the roller bearing 4 and casing head formed by the enveloping jacket 3a practically constitute a single rigid piece; otherwise owing to oblique positioning of the spindle shaft A with respect to the roller bearing 4 edge jamming between the rollers and the spindle shaft would occur, which would lead to the destruction of the roller bearing.

The minimum degree of tension of the enveloping jacket 3a, necessary for holding the roller bearing 4 and the bushing 1 permanently and firmly together with the enveloping jacket 3a and top edge 3b, moreover depends on the play provided in the lower damping device of the spindle and on the bending-resistance of the ring segments in the yielding connection zone provided in the journal casing 3. Thus the clearance provided in the lower damping device of the spindle for the pendular movement of the latter, the bending resistance of the said ring segments and the holding-together strength of the enveloping jacket 3a with respect to the roller bearing 4 and the bushing 1 are in a certain correlation with each other; according to this correlation the degree of heating of the enveloping jacket prior to the insertion of the bushing 1 and the roller bearing 4, and consequently the degree of tension produced in the enveloping jacket 3a will be determined.

What I claim is:

1. A mounting for rotatably supporting a textile mill spindle comprising a journal casing having a tubular portion thereon, an internal annular shoulder in said casing from which said tubular portion extends axially, a bushing within said journal casing and having an external annular flange against said internal shoulder and of substantially the same outside diameter as the inside diameter of said tubular portion and terminating at the inside diameter of said tubular portion, an annular member against said external annular flange having substantially the same outside diameter as the internal diameter of said tubular portion, an anti-friction bearing against said annular member having an outer bearing race with an outside diameter substantially the same as the inside diameter of said tubular portion, an upper annular member against said anti-friction bearing having an outside diameter substantially the same as the inside diameter of said tubular portion, and an inwardly extending flange on the end of said tubular portion against said upper annular member, said tubular portion being axially shrink-stressed, whereby said bushing flange, said annular member, said anti-friction bearing and said upper annular member are maintained between said internal shoulder and said inwardly extending flange.

2. The manufacture of a mounting for supporting a textile mill spindle, the method of assembling a casing having a tubular portion thereon, an internal annular shoulder in said casing from which said tubular portion extends axially, a bushing having an external annular flange of a size to terminate at the inside diameter of said tubular portion, an annular member with the same outside diameter as the inside diameter of said tubular portion, an anti-friction bearing with an outer race of the same outside diameter as the inside diameter of said tubular portion, and an upper annular member with the same outside diameter as the inside diameter of said tubular portion, comprising the steps of heating said tubular portion, heating the end zone of said tubular portion to a higher temperature than the remainder of said tubular portion, inserting the bushing, the annular member, the anti-friction bearing and the upper annular member in that order and in an unheated condition into said heated tubular portion with the external annular flange on the bushing on the internal annular shoulder, flanging the end zone of said tubular portion inwardly over the upper annular member, and cooling the tubular portion to draw the external annular flange on the bushing, the annular member, the anti-friction bearing and the upper annular member together axially between the inwardly flanged end zone of the tubular portion and the internal annular shoulder.

References Cited in the file of this patent

UNITED STATES PATENTS

| 881,471 | Hoffman | Mar. 10, 1908 |
| 1,146,272 | Neukirch | July 13, 1915 |
| 2,529,904 | Beerli | Nov. 14, 1950 |
| 2,583,080 | Beerli | Jan. 22, 1952 |

FOREIGN PATENTS

| 455,211 | Germany | Aug. 2, 1924 |